United States Patent [19]
Check et al.

[11] Patent Number: 6,108,776
[45] Date of Patent: *Aug. 22, 2000

[54] GLOBALLY OR SELECTIVELY DISABLING BRANCH HISTORY TABLE OPERATIONS DURING SENSITIVE PORTION OF MILLICODE ROUTINE IN MILLIMODE SUPPORTING COMPUTER

[75] Inventors: Mark Anthony Check, Hopewell Junction; John Stephen Liptay, Rhinebeck; Timothy John Slegel, Staatsburg; Charles Franklin Webb, Poughkeepsie; Mark Steven Farrell, Pleasant Valley, all of N.Y.

[73] Assignee: International Business Machines Corporation, Armonk, N.Y.

[*] Notice: This patent is subject to a terminal disclaimer.

[21] Appl. No.: 09/070,362

[22] Filed: Apr. 30, 1998

[51] Int. Cl.[7] ........................................... G06F 9/32
[52] U.S. Cl. ............................. 712/240; 712/243
[58] Field of Search .................... 712/240, 243

[56] References Cited

U.S. PATENT DOCUMENTS

| | | | |
|---|---|---|---|
| 5,228,131 | 7/1993 | Ueda et al. .............................. | 712/240 |
| 5,276,882 | 1/1994 | Emma et al. ............................ | 712/240 |
| 5,345,567 | 9/1994 | Hayden et al. .......................... | 712/228 |
| 5,634,119 | 5/1997 | Emma et al. ............................ | 712/240 |
| 5,694,617 | 12/1997 | Webb et al. .............................. | 710/40 |

*Primary Examiner*—Kenneth S. Kim
*Attorney, Agent, or Firm*—Lynn L. Augspurger

[57] ABSTRACT

A millimode capable computer system provides control to millicode to allow the BHT operations to continue except when the these special situations occur that require control of instruction fetch operations must be provided and the BHT can be turned off for some sections of code execution, but not disabled for all. A single free running BHT functions for both a normal mode and a millimode for the central processor which can execute in millimode with a branch history table directing instruction fetch for which both a global BHT disable and millicode disables exist. Hit detection logic receives input from the global BHT disable, as well as from an initialized control register bit and a processor control register bit to select the correct set target information and generate a "branch history table hit detected" control signal.

9 Claims, 3 Drawing Sheets

GLOBALLY OR SELECTIVELY DISABLING BRANCH HISTORY TABLE OPERATIONS DURING SENSITIVE PORTION OF MILLICODE ROUTINE IN MILLIMODE SUPPORTING COMPUTER

CROSS REFERENCE TO RELATED APPLICATION

The present application related to the following co-pending patent application by the inventors hereof filed concurrently herewith as U.S. Ser. No. 09/070,201, filed Apr. 30, 1998, entitled:

"Millimode System with Branch History Table Disables".

This co-pending application and the present application are owned by one and the same assignee, International Business Machines Corporation of Armonk, N.Y.

FIELD OF THE INVENTION

This invention is related to a computer system having a branch history table which can handle BHT disables.

BACKGROUND OF THE INVENTION

As noted in U.S. Pat. No. 5634119 granted May 27, 1997 entitled "Computer processing unit employing a separate millicode branch history table" described a computer processing system which has memory mapped into at least a first and second region, with the first region storing instructions belonging to a first instruction set architecture of the computer processing system and with the second region storing instructions belonging to a second instruction set architecture of the computer processing system. In such a system a computer processing system included first memory that stores instructions belonging to a first set of instructions and a second memory that stores instructions belonging to a second set of instructions. An instruction buffer is coupled to the first and second memories, for storing instructions that are executed by a processor unit. The system operates in one of two modes. In a first mode, instructions are fetched from the first memory into the instruction buffer according to data stored in a first table. In the second mode, instructions are fetched from the second memory into the instruction buffer according to data stored in a second table. Typically, the first and second set of instructions include at least one branch type instruction. In the illustrative embodiment, each set of instructions had its own Branch History Table (BHT). The first table is a branch history table associated with the first set of instructions and the second table is a branch history table associated with the second set of instructions. The first set of instructions may be system level instructions and the second set of instructions may be millicode instructions that for example, define a complex system level instruction and/or emulate a second instruction set architecture.

The IBM S/390 (both registered trademarks of International Business Machines Corporation) in a feature used in IBM's ESA/390 G4 machines which used millicode in the hierarchical cache structure and a millimode operating mode as well as a system mode using a read only storage structure for millicode in an SMP environment. In a later generation there is a processor that uses a single Branch History Table to hold branch information for all modes of operations. The operation of the branch history table allows the instruction fetch operations in the processor to proceed to the targeted instruction stream without direction first being given as a result of decoded or executing instructions. There are certain actions that millicode performs that requires control over the operation and actions of instruction fetching. These may include types and addresses of requests sent to the cache for functional reasons.

It is noted that many processor designs have available global disable functions to stop BHT operation if there has been a hardware failure or functional problem with the BHT. Those that are skilled in the art would be aware of this existence and use.

SUMMARY OF THE INVENTION

Our invention provides a millimode capable computer method for a system having a central processor and a normal mode of operation and a millimode of operation. This computer system has a branch history table, in which the branch history table contains branch entries from both operation in S/390 mode and all licensed internal code modes, including a highly privileged mode known as millicode mode, with controls for the millicode to selectively enable and disable instruction fetching of target data from the branch history table entries. These controls are provided by two different means for multiple reasons. They are also different than a global control that allows branch history table functionally set when the processor is initialized for which the value is determined based upon if the branch history table functions properly or not.

One reason that the millicode would need to control when instruction fetches can occur is times when the millicode is doing sensitive system operations that require control of the type of cache functions that can occur. There are two mechanisms that can be used to control branch history table actions. Which will be used is determined by the specific millicode sequence being invoked. At the time of the entry into a millicode routine certain millicode control registers are initialized to the desired values. One bit in one of these registers when initialized to a value of one will result in the matching mechanism of the branch history table to be disabled and no further instruction fetches of the targets of these entries will be performed. Later, after code has passed the sensitive parts of the routine, millicode may turn this control bit off and reenable branch history table functions. For the second mechanism the branch history table is active upon entry to the millicode routine. Then, as the area of the sensitive function nears, millicode may write a bit in a processor disable control register to a value of one which also disables the matching mechanism. Later when the sensitive area has passed then code can re-enable the branch history table.

The second use for the millicode control to disable branch history table function is when a very specific sequence of branching loops will be executed that the branch history table function does not help performance but hinders it. The branch history table is designed to in general predict and fetch the target of the branches in an instruction stream. However in some cases of tight branch loops with certain branch direction sequences the branch history table will not provide the desired result, but instead delays as it may send the processor to the wrong spot or miss the desired branches. Just before such sequences the millicode may write the bit in the processor disable control register to disable the branch history table and later after the special sequence of instruction loops and or branches have passed re-enable the branch history table function.

The two mechanisms only effect branch history table operation when the processor is in millicode mode. While both mechanisms effect the results of the branch matching mechanism, they have one significant difference. The bit which is written at millicode entry time is written for every entry based on the routine being entered. Thus the prior value of the disable bit does not have meaning, and millicode exiting a routine that had the branch history table disabled from the initialized state does not need to re-enable the function. While when millicode uses the processor control register bit, the routine must reenable the function, otherwise the next millicode routine will also have the function disabled until millicode explicitly re-enables the functionally of the branch history table.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

The S/390 (trademark of International Business Machines Corporation) machines have evolved from large bi-polar mainframes to powerful servers having the mainframe capability but founded with a CMOS environment. The term G4 as applied to the recent series has been so called as a fourth generation or G4. Starting with designs for the G4 series a mode of operation called millicode has been used to provide a means to perform complex or difficult system actions in sequences of simpler instructions that can be executed by the processor. Millicode is code for highly privileged subroutines formulated in 390-like code.

In the new processor design a branch history table (BHT) has been added to provide branch prediction capability to enhance performance. This single BHT is used to hold branch information about both ESA/390 and millicode branches (as well as other internal code branches which can be performed). The S/390 machines that use a BHT that contains partial addresses for both S/390 and millicode branches with the partial target address of the branch use the information to make Instruction fetches to the expected locations of the branch targets. Complexity arises when ESA mode's system set of instructions and the milli-mode set uses the same Branch History Table (BHT).

There are certain millicode operations that while in progress are not allowed to have new logical requests made to the cache during some interval of time. Having them occur can produce error cases. The BHT is free running and can make requests anytime it finds the need to start up a new Ifetch (instruction fetch) stream provided resources are available to start such a fetch. This is done by initiating a logical Ifetch. One solution would be to prevent BHT operation during times when the processor is running in millicode mode. However the BHT is of significant performance benefit and should be running during millicode operation. Millicode has no direct way to control Ifetch actions. In order prevent unwanted logical requests from occurring in specific windows of time the millicode must have a way to control the actions of the free running BHT search and fetch controls. Our mechanism provides control to millicode to allow the BHT operations to continue except when the these special situations occur that require control of instruction fetch operations.

In yet other cases there may be specific millicode instruction sequences that are actually hindered by the actions of the BHT in tight loops that it would be better performance if the BHT could be turned off for some sections of code execution, but not disabled for all.

Figure 1:
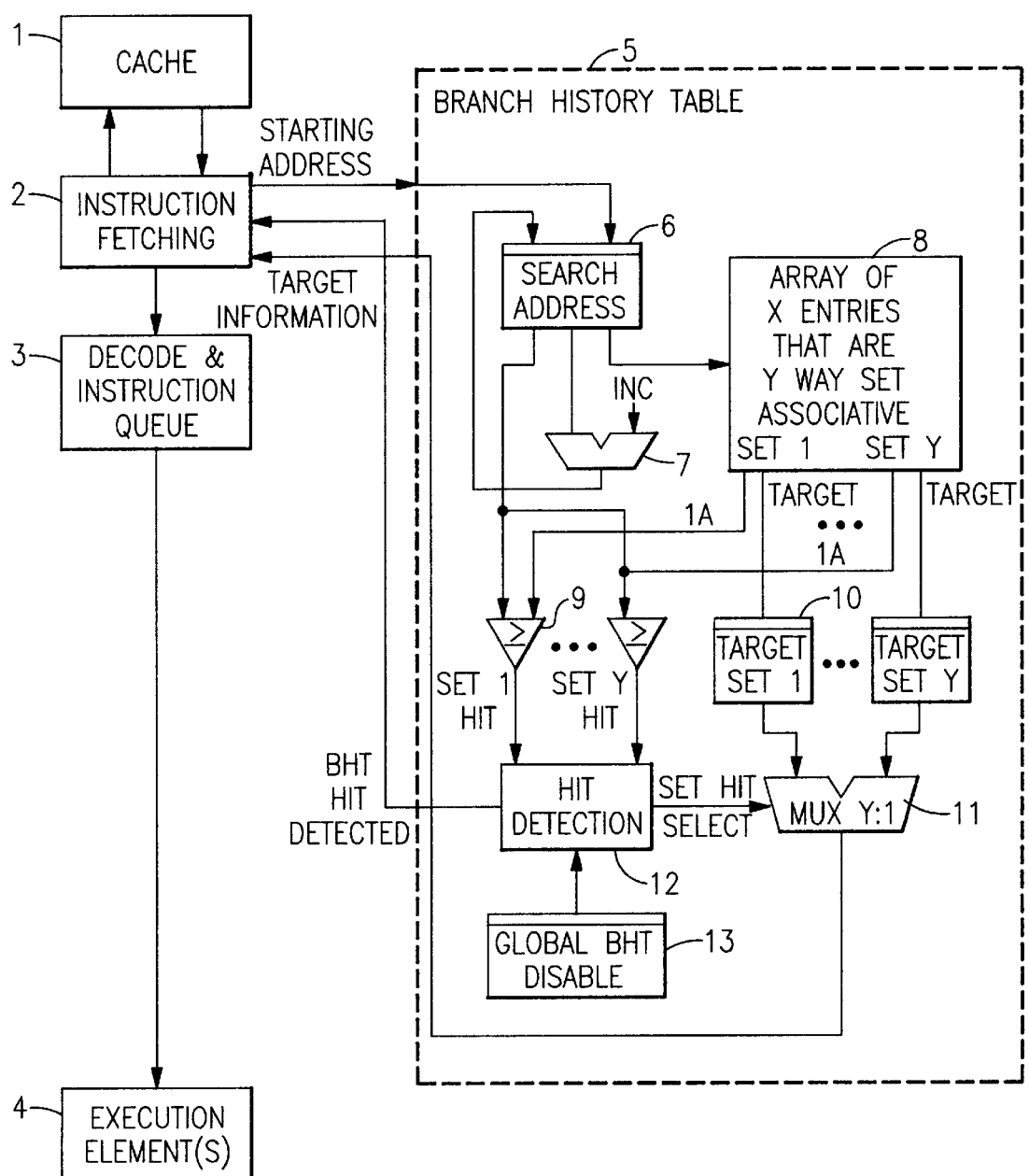
FIG. 1 shows a block diagram of a central processor with a branch history table directing instruction fetch for which only a global BHT disable exists.

In a processor such as in FIG. 1 that has a BHT (5) that is providing information that directs instruction fetching (2) the BHT functions in a nearly asynchronous fashion in order to predict the target instruction stream to have available to the instruction decode (3) the instruction text to provide instruction to the execution element(s) (4). The branch history table (5) is provided a starting address to search (6) which it uses to access the BHT array (8). It will increment (7) by an amount chosen in the design of the BHT to search for possible branch instructions.

In the BHT (5) the design has been chosen to determine the length of instruction text in bytes which will be handled by each entry in the BHT array (8) and how many possible branches in that size will be held by the set associativity of the array from 1 to Y sets. Each entry will contain information about the instruction address of the branch, the target of the branch, and some state information about the entry. These addresses could be whole or partial depending on the available area on the chip and the address range of the architecture. The target information is latched in registers (10) and the instruction address information is compared against the search address by comparators (9). The results of these instruction address comparators (9) and the global disable latch (13) are used to determine if a hit has occurred and which set is desired in the hit detection logic (12). The selection of the set is used to control the multiplexer (11) to gate the correct branch target information to the instruction fetch (2).

Figure 2:
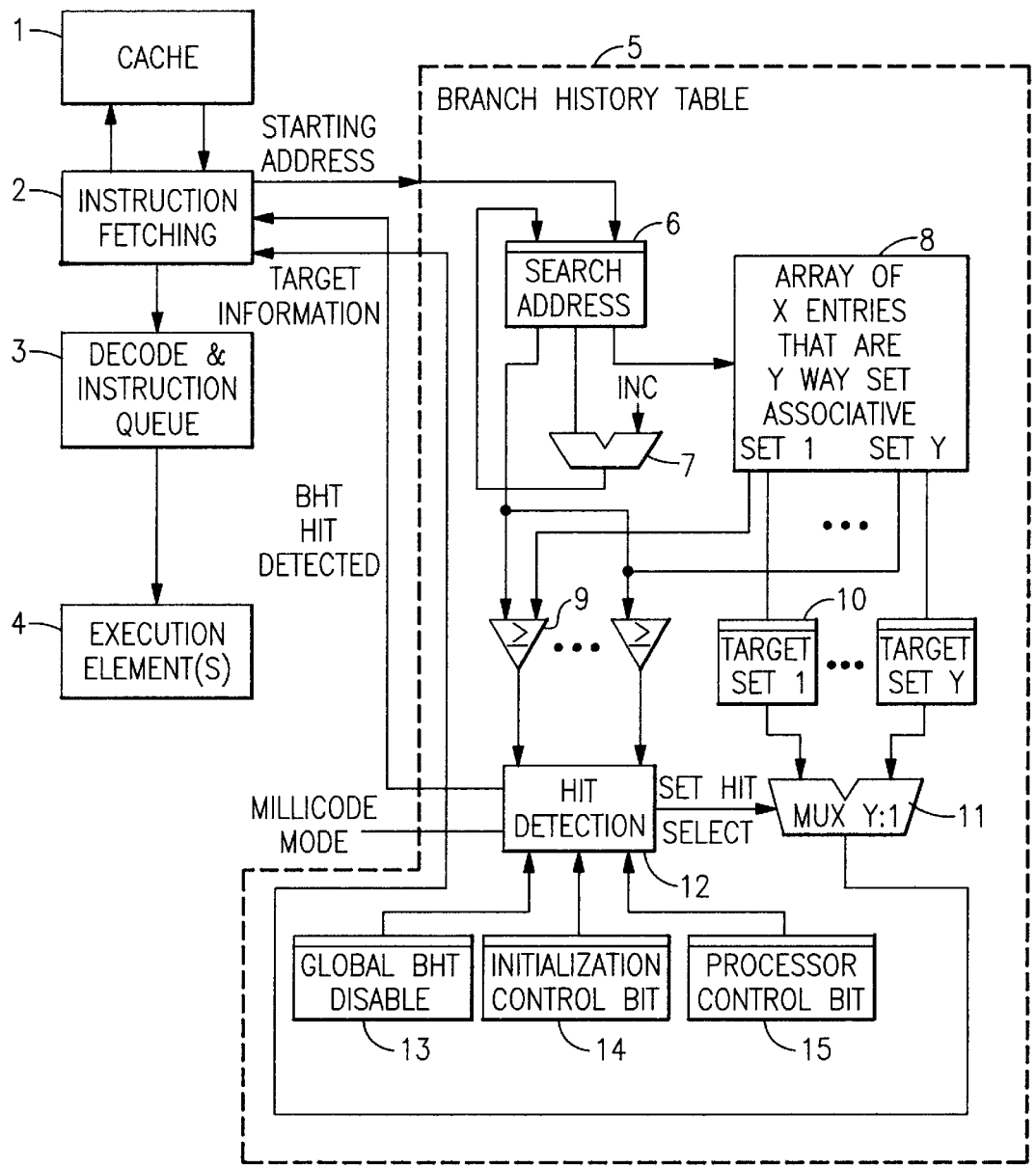
FIG. 2 shows a block diagram of our preferred embodiment in which a central processor can execute in millimode with a branch history table directing instruction fetch for which both a global BHT disable and two millicode disables exist.

In FIG. 2 two more millicode disable latches (14 & 15) and information of the current mode of the processor are added to the hit detection (12). These are bit copies of values in the larger registers they are a part of.

Figure 3:
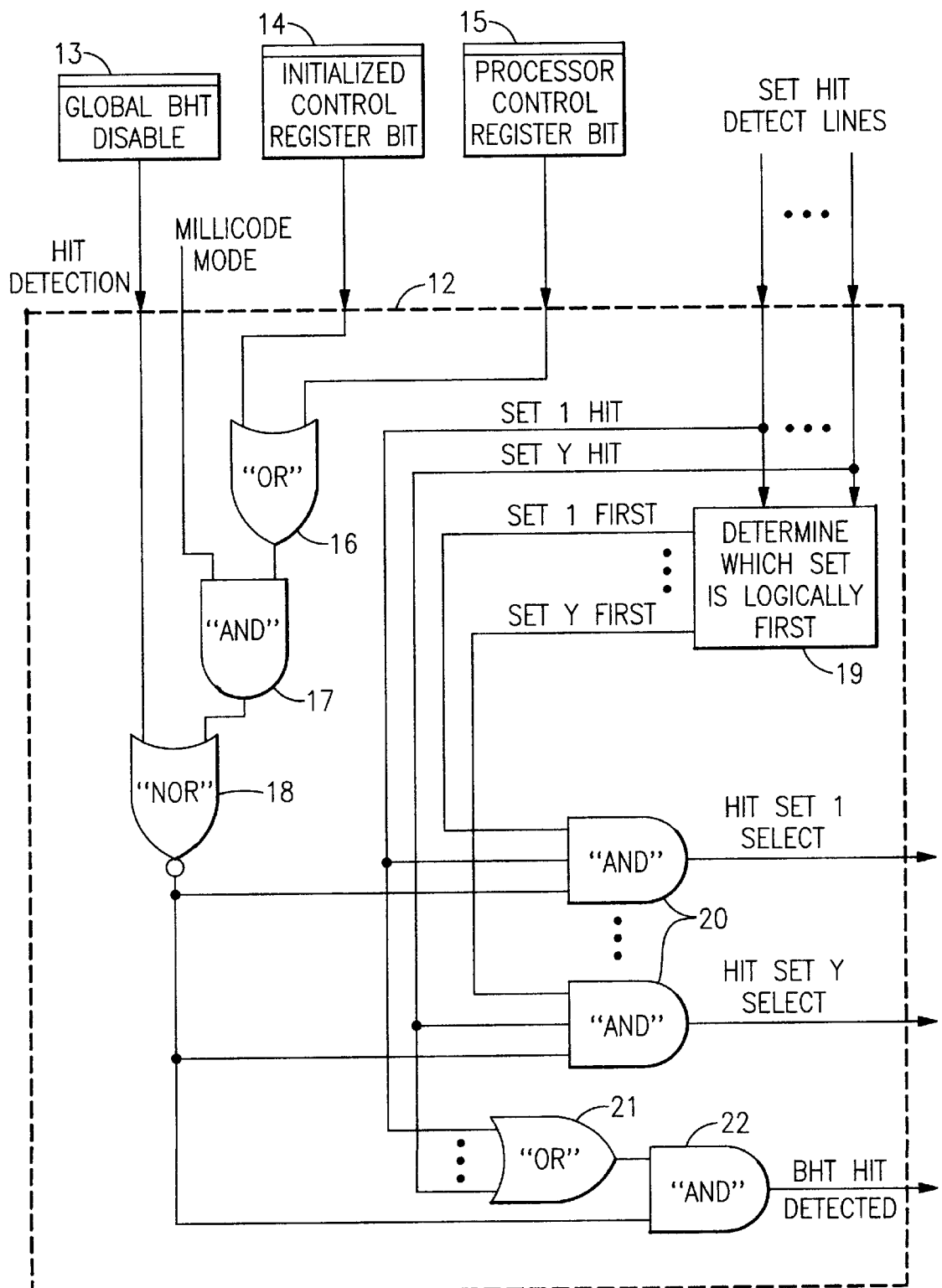
FIG. 3 shows the details of the interaction of blocks 12, and 13, 14, and 15 of our preferred embodiment showing how disables are used in the hit detection logic 12 to select the correct set target information and generate a "hit detected" control signal.

In FIG. 3 the details of how the hit detection logic (12) function are shown. The instruction address information of the possible branches from each set in the searched BHT array (8) are compared against the search instruction address (6). These compares (9) will check to see if the set instruction address matches the search address (6) and if multiple matches in that set occur which set comes logically first (19). The two new millicode disable values, control bit set at millicode routine startup (14) and the processor disable control bit (15) are logically "or" ed (16) and then "and" ed (17) with the millicode mode bit as these disables are only valid when the processor is executing in millicode mode. This is then "nor" ed (18) with the global disable function (13) which is used to turn off the BHT if it has had circuit failure or functionally does not perform as required. This is then "and" ed (20) with the set hit and set ordering information to provide select lines to the target information multiplexer (11). The set hit lines are also "or" ed together (21) then "and" ed (22) with the disable function to determine the value of the BHT hit detected line. It is this signal with the target data that provides direction to instruction fetch (2) to request this data from the cache (1). It should be noted that the target data is latched from the array and that cycle time will likely require a latch point somewhere in the hit detection logic. This is not shown because for each design it would be in a different place. However, since the target information is put into a latch (10) before the multiplexing (11) and being sent back to instruction fetch (2), a latch (not shown in either FIG. 1 or FIG. 2) will be required some place in the path that detects the BHT hit information.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A millimode capable computer method for a system having
   a central processor and a normal mode of operation and a millimode of operation,
   a cache, an instruction fetch unit, and instruction decode unit, and an execution unit, and the instruction fetch unit coupled to a branch history table for control of instructions processing in normal mode and millimode, comprising the steps of:
      providing control for millicode to allow the BHT operations to continue except when special situations occur that require control of instruction fetch operations, and for directing instruction fetch for both a global BHT disable and for separate millicode disables and wherein said branch history table operations can be turned off for some sections of code execution, but not disabled for all, by
      providing a millimode operation for system operations that require control of type of cache functions that can occur and when instruction fetches can occur under millimode control including two processes used to control branch table history actions, a first process of which globally disables branch table history BHT actions and a second process of which enables branch table history BHT action,
      determining which of the two processes will be used by the specific millicode sequence being invoked, and
      at the time of entry into a specific millicode sequence initializing millicode control registers to desired values where one bit in one of said millicode control registers when initialized to a value of one will result in the matching mechanism of the branch history table to be disabled and no further instruction fetches of the targets of these entries will be performed,
      and, later, after said millicode sequence has passed sensitive parts of the millicode sequence routine millicode turns this control bit off and re-enables branch history table functions.

2. A method according to claim 1, further comprising the steps of:
   when the computer's the branch history table is active upon entry to the millicode routine, then as the area of a sensitive function nears millicode writes a bit in a processor disable control register to a value which disables the matching mechanism, and thereafter in the millicode routine, when the area of a sensitive function area has passed then a millicode routine re-enables the branch history table of the processor.

3. A method according to claim 2, further comprising the steps of: the branch history table contains branch entries from both operation an S/390 mode and a licensed internal code millicode mode, with controls for the millicode to selectively enable and disable instruction fetching of target data from the branch history table entries.

4. A method according to claim 2, where in the process
   a single free running branch history table functions for both a normal mode and a millimode for the central processor, and
   branch history table logic directs instruction fetch under control of both a global BHT disable and millicode disables.

5. A method according to claim 2, where in the process both a global BHT disable and two millicode disable functions exist.

6. A method according to claim 5, where in the process hit detection logic which receives input from the global BHT disable, as well as from an initialized control register bit and a processor control register bit, and said hit detection logic selects correct set target information and generates a "branch history table hit detected" control signal.

7. A method according to claim 6, where in the process said processor has a BHT that provides information that directs instruction fetching; the BHT functions in a nearly asynchronous fashion in order to predict the target instruction stream to have available to the instruction decode; the instruction text to provide instruction to the processor's execution element(s); and the branch history table provides a starting address to searching the branch history table array, incrementing by an amount chosen by branch history table design to search for possible branch instructions.

8. A method for use in a computer having a branch history table and normal and millimode mode of operations for controlling when instructions are to be fetched, comprising the steps of:
   providing a millimode operation for system operations that require control of type of cache functions that can occur and when instruction fetches can occur under millimode control including two processes used to control branch table history actions, a first process of which globally disables branch table history BHT actions and a second process of which enables branch table history BHT action,
   determining which of the two will be used by the specific millicode sequence being invoked, and
   at the time of entry into a specific millicode sequence initializing millicode control registers to desired values where one bit in one of said millicode control registers when initialized to a value of one will result in the matching mechanism of the branch history table to be disabled and no further instruction fetches of the targets of these entries will be performed,
   and, later, after said millicode sequence has passed sensitive parts of the millicode sequence routine millicode turns this control bit off and re-enables branch history table functions.

9. A method for use in a computer having a branch history table and normal and millimode mode of operations for controlling when instructions are to be fetched, comprising the steps of:
   when the computer's the branch history table is active upon entry to a millicode routine, then as the area of a sensitive function which occurs when a millicode section of the millicode routine is executed to perform sensitive system operations that require control of the of cache functions that can occur within the computer nears a time for execution of said millicode section of the millicode writes a bit in a processor disable control register to a value which disables the matching mechanism, and thereafter in the millicode routine, when the area of a sensitive function provided by said millicode section area has passed then a millicode routine re-enables the branch history table of the processor.

* * * * *